United States Patent
Kotecha et al.

(10) Patent No.: US 9,742,814 B2
(45) Date of Patent: Aug. 22, 2017

(54) SELECTIVE CALL BLOCKING AND CALL RE-DIRECTION

(71) Applicant: Verizon Patent and Licensing Inc., Basking Ridge, NJ (US)

(72) Inventors: Lalit R. Kotecha, San Ramon, CA (US); Jignesh S. Panchal, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 311 days.

(21) Appl. No.: 14/230,389

(22) Filed: Mar. 31, 2014

(65) Prior Publication Data

US 2015/0281438 A1    Oct. 1, 2015

(51) Int. Cl.
*H04L 29/06* (2006.01)
*H04L 29/12* (2006.01)
*H04M 3/436* (2006.01)

(52) U.S. Cl.
CPC ...... *H04L 65/1016* (2013.01); *H04L 61/1529* (2013.01); *H04L 65/1046* (2013.01); *H04L 65/1069* (2013.01); *H04M 3/436* (2013.01)

(58) Field of Classification Search
CPC ..... H04M 3/436; H04M 3/54; H04L 61/1529; H04L 65/1016; H04L 65/1046; H04L 65/1069
See application file for complete search history.

(56) References Cited

U.S. PATENT DOCUMENTS

| | | | | |
|---|---|---|---|---|
| 2003/0233457 A1* | 12/2003 | Basilier | .................. | H04L 29/06 709/227 |
| 2008/0026752 A1* | 1/2008 | Flore | ................ | H04W 36/0022 455/435.2 |
| 2013/0005317 A1* | 1/2013 | Lazaridis | ................ | H04M 3/54 455/417 |
| 2014/0133361 A1* | 5/2014 | Pankajakshan | ......... | H04W 4/02 370/259 |
| 2015/0011175 A1* | 1/2015 | Mondal | ............... | H04W 76/007 455/404.2 |

* cited by examiner

*Primary Examiner* — Ian N Moore
*Assistant Examiner* — Justin T. Van Roie

(57) ABSTRACT

A selective call blocking function (SCBF) device, included in an internet protocol (IP) multimedia subsystem (IMS), processes a request to establish an IP call on an LTE network, such as a voice over long term evolution (VoLTE) call. The SCBF device identifies a user equipment (UE) associated with the IP call and an associated eNode B (eNB). For example, the SCBF may access a subscriber location memory to determine a location of the UE and an eNB associated with the location. The SCBF determines whether the eNB supports the IP call, and permits the IP call to be established via the IMS when the eNB supports the IP call. When the eNB does not support the IP call, the SCBF blocks the IP call and initiates a non-IP call, such as a 1× call, to the UE to prevent communications interruptions.

15 Claims, 8 Drawing Sheets

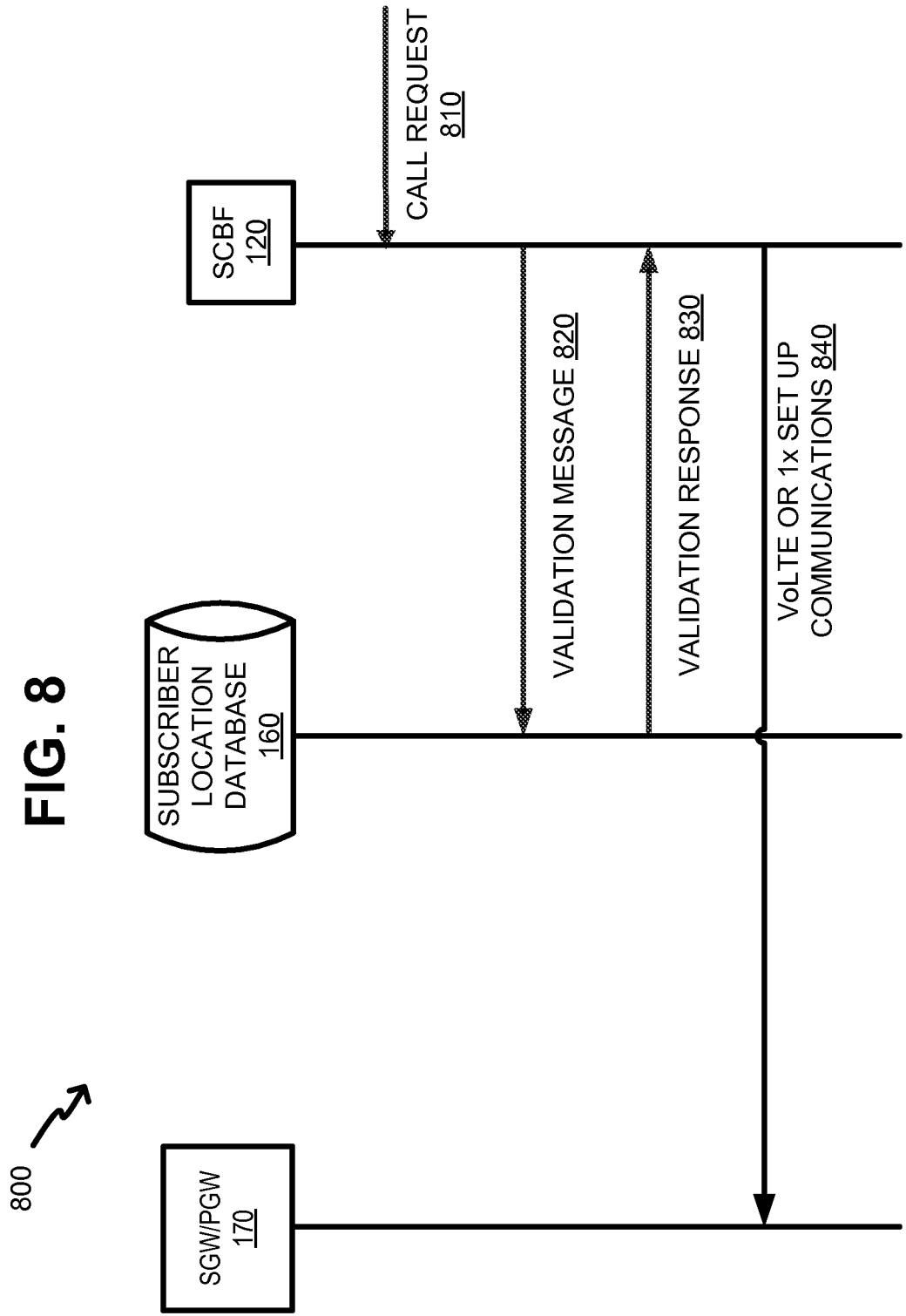

SELECTIVE CALL BLOCKING AND CALL RE-DIRECTION

BACKGROUND

Fourth generation (4G) wireless access technologies, such as the long-term evolution (LTE), are optimized for data transmissions, and call data may be delivered using internet protocol (IP) packets using voice over internet protocol (VoIP) technology. Older second generation (2G) and third generation (3G) voice technologies, such as global system for mobile communications (GSM), code division multiple access (CDMA) 2000 1× (IS-2000), also known as one-times (1×) radio transfer technology (RTT) or simply 1×, and universal mobile telecommunications system (UMTS), are mature and optimized for voice performance. Although LTE access is becoming increasingly common, coverage and performance for voice over LTE (VoLTE) transmissions are not as optimized across different LTE cells, resulting in relatively high rates of failures with VoLTE calls. As a user moves between cells, the user may move from a cell that is optimized for VoLTE calls to another cell that does not support LTE or is not optimized for VoLTE calls (e.g., provides insufficient bandwidth to a calling device). To minimize issues associated with attempting to initiate a VoLTE call within a cell that is not optimized for VoLTE calls, some operators default to using the older 2G and 3G voice technologies in all cells, even if some cells would support VoLTE calls.

BRIEF DESCRIPTION OF THE DRAWINGS

FIGS. 7 and 8 show exemplary communications between devices included in the environment of FIG. 1 in connection with the process shown in FIGS. 5 and 6.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations discussed herein relate to an internet protocol (IP) multimedia subsystem (IMS)-based method of selective call blocking according to a user's location and subsequent call re-direction over a different (non-IMS) network. The IMS network may include a selective call blocking function (SCBF) device that processes a request to establish an IP call, such as voice over long term evolution (VoLTE) call. The SCBF identifies a user equipment (UE) and an evolved node B, (eNode B or eNB) associated with the IP call. For example, the SCBF may identify the UE based on the contents of a receive call request, and the SCBF may poll a subscriber location memory to determine the eNB. The SCBF may determine whether the identified eNB supports the IP call, and the IP call may be established via the IMS when the eNB supports the IP call. If the SCBF determines that the identified eNB does not support the IP call, the SCBF may block the IP call, and the SCBF may initiate a non-IP call, such as a 1× call to the UE to prevent call disruption.

As used herein, the term "user" is intended to be broadly interpreted to include a user device or a person using the user device. Also, the terms "user," "consumer," "subscriber," and/or "customer" may be used interchangeably.

Figure 1:
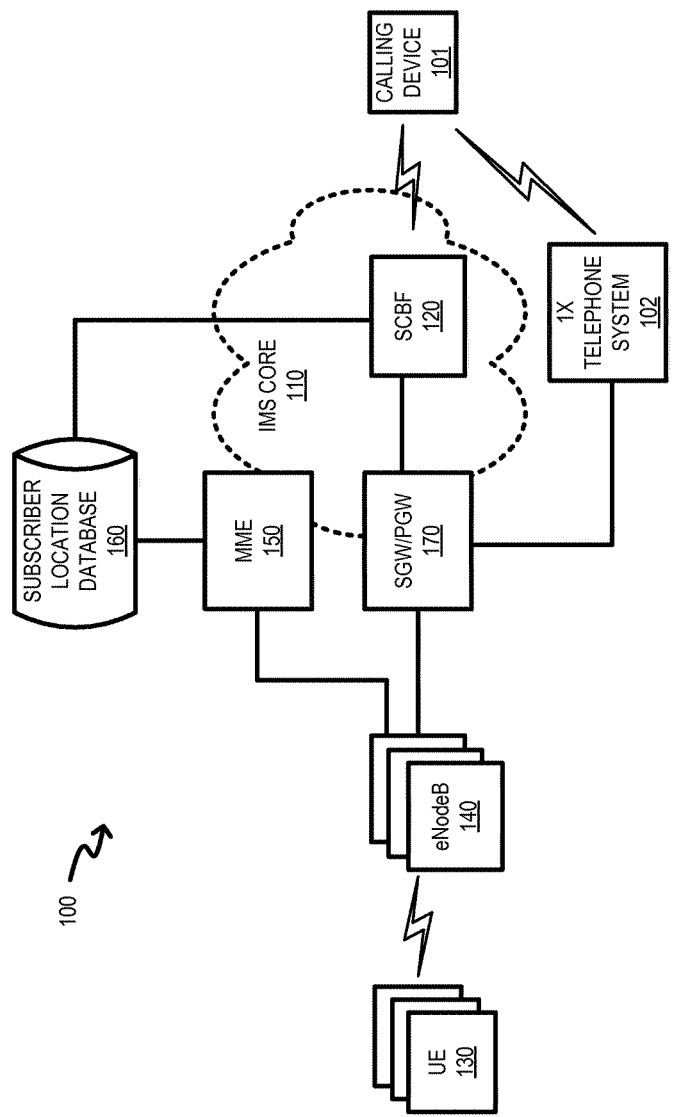
FIG. 1 shows exemplary devices that may be included in an environment in which systems and/or methods described herein may be implemented for user-initiated activation of a user device included in the environment.

FIG. 1 is a diagram of an exemplary environment 100 in which systems and/or methods described herein may be implemented. As shown in FIG. 1, environment 100 may include an IMS core 110 that includes an SCBF 120, as shown, to administer communications between a calling device 101 and user equipments (UEs) 130. SCBF 120 may determine whether voice over LTE (VoLTE) communications or other IP-based calls are available between a particular UE 130 and calling device 101. For example, SCBF 120 may determine whether an appropriate LTE data connection is available to the particular UE 130 via, for example, an associated eNB 140, a servicing gateway and packet data network gateway (SGW/PGW) 170, and other components connecting the particular UE 130 to the IMS core 110.

When determining whether an appropriate LTE data connection is available to the particular UE 130, SCBF 130 may communicate with a mobility management entity (MME) 150 that maintains a subscriber location memory 160 identifying a particular eNB 140 coupled to the particular UE 130. MME 150 may determine the particular eNB 140 based on evaluating how data is exchanged with the particular UE 130.

SCBF 120 may further determine whether the particular eNB 140 is optimized for VoLTE communications when a call is being establishing between the particular UE 130 and calling device 101. When VoLTE communications are available to UE 130 (e.g., an appropriate LTE data connection is available via eNB 140), SCBF 120 may allow a VoLTE call to be established between UE 130 and calling device 101 via IMS core 110. Alternatively, when VoLTE communications are not available to UE 130, SCBF 120 may block the VoLTE communications via IMS core 110 and, instead, may initiate a non-IP-based call between UE 130 and calling device 101. For example, SCBF 120 may initiate communications between UE 130 and calling device 101 via 1× system 102.

Continuing with environment 100 in FIG. 1, IMS core 110 may include components for providing IP multimedia services and for administering data exchanges between eNB 140 and a data network (not shown). For example, IMS core 110 may include a home subscriber server and authentication, authorization, accounting (HSS/AAA) device (not shown) that stores and administers subscriber profiles; a call session control function (CSCF) device (not shown) to process session initiation protocol (SIP) signaling packets in IMS core 110; a policy and charging rules function (PCRF) device (not shown) to administer data transfer policies (e.g., bandwidth and quality of service requirements), etc.

Continuing with environment 100 in FIG. 1, SCBF 120 may be included as one or more components of IMS core 110, such as the CSCF device or may be a device that is separate from IMS core 110, such as a telephony application server (not shown) or a separate business to business (B2B) user agent functionality device (not shown). SCBF 120 may include or be coupled to eNB configuration memory 122 that stores information identifying, for example, whether eNB 140 supports VoLTE communications. For example, SCBF 120 may store, to eNB configuration memory 122, information indicating whether a VoLTE communication has been previously established successfully to eNB 140 during a prior threshold time.

As described herein, SCBF 120 may function to identify a corresponding eNB 140 associated with a particular UE 130 and may use this information to determine whether to proceed with establishing a VoLTE call between the particular UE 130 and calling device 101. For example, SCBF 120 may parse a message, sent by the particular UE 130 to IMS core 110 to initiate a call to calling device 101, to identify the particular UE 130. SCBF 120 may identify the associate eNB 140 by parsing the message, or SCBF 120 may identify the particular eNB 140 by performing a lookup in subscriber location memory 160. SCBF 120 may further determine (e.g., based on eNB configuration memory 122) whether a VoLTE call is allowed via the particular eNB 140, and if the VoLTE call is allowed via the particular eNB 140, SCBF 120 may allow regular IMS signaling to continue with respect to establishing the VoLTE call. If the VoLTE call is not allowed in the particular eNB 140, SCBF 120 may send a call rejection message to the particular UE 130 that causes the particular UE 130 to initiate the call using a non-IP system, such as 1× system 102.

In another example, SCBF 120 may evaluate an incoming call request from calling device 101 and to identify an associated UE 130 and to determine whether to establish VoLTE communications with the associated UE 130. SCBF 120 may additionally, or alternatively, perform a look up of the associated UE 130 in subscriber location memory 160 to determine the associated eNB 140 or a geographic location of the associated UE 130. SCBF 120 may then identify a particular eNB 140 associated with the geographic location and determine whether the particular eNB 140 is optimized for VoLTE communications (e.g., determine whether an LTE data connection can be established to the associated UE 130 via the particular eNB 140 and IMS core 110). For example, SCBF 120 may store information (e.g., in eNB configuration memory 122) identifying eNBs 140 that are optimized for VoLTE communications. If the VoLTE call is allowed via the particular eNB 140, regular IMS signaling may continue with respect to establishing the VoLTE call between calling device 101 and the associated UE 130. Conversely, if the VoLTE call not allowed in the particular eNB 140, SCBF 120 may redirect the call to 1× system 102 for a non-IP communications with the associated UE 130.

Continuing with environment 100 in FIG. 1, UE 130 may include a computation and communication device, such as a wireless mobile communication device that is capable of communicating with eNB 140 and/or a network (e.g., IMS core 110). For example, UE 130 may include a cellular telephone; a personal communications system (PCS) terminal (e.g., that may combine a cellular telephone with data processing and data communications capabilities); a personal digital assistant (PDA) (e.g., that can include a radio-telephone, a pager, Internet/intranet access, etc.); a smart phone; a laptop computer; a tablet computer; a camera; a personal gaming system, or another type of mobile computation and communication device. UE 130 may exchange traffic with eNB 140. UE 130 may also, or alternatively, include one or more components such as global positioning system (GPS) components (not shown) that enable a location, associated with UE 130, to be identified.

Continuing with environment 100 in FIG. 1, eNBs 140 may include one or more network devices that receive, process, and/or transmit traffic, such as audio, video, text, and/or other data, destined for and/or received from UE 130. Additionally, or alternatively, one or more of the eNBs 140 may be associated with a wireless network that is not associated with the LTE network (e.g., a wireless hot spot, a wireless access point, a 3G/2G base station, etc.). The eNB 140 may exchange traffic with IMS core 110 via SGW/PGW 170. The eNB 140 may exchange traffic with UE 130 via wireless transmission over an air interface. The eNB 140 may receive, from SCBF 120, instructions to suspend a VoLTE call and/or to the convert the VoLTE call to another system, such as 1× system 102. The eNB 140 may, in response to the instructions to suspend the VoLTE call, continue to perform signaling and/or maintain protocols (e.g., tunneling protocols, etc., associated with the call), thereby helping to minimize termination of the call.

Continuing with environment 100 in FIG. 1, MME 150 may perform policing operations for data destined for and/or received from UE 130. MME 150 may further perform operations associated with a handoff to and/or from IMS core 110. MME 150 may perform operations to register UE 130 with IMS core 110; cause SGW/PGW 170 to hand off UE 130 from IMS core 110 to another network (e.g., to 1× telephone system 102); cause SGW/PGW 170 to hand off a UE 130 from the other network to IMS core 110, etc.

As described herein, MME 150 may maintain and update subscriber location memory 160. For example, MME 150 may monitor messages from a UE 130 when the UE 130 requests to communicate with eNB 140, and MME 150 may store, in subscriber location memory 160, a Mobile Directory Number (MDN), an International mobile Subscriber Identity (IMSI), or other information associated with the UE 130.

MME 150 may further store, in subscriber location memory 160, information identifying the eNB 140 connected to (i.e., exchanging data with) the UE 130. Thus, subscriber location memory 160 may include information (e.g., an eNB identifier) identifying a corresponding eNB 140 connected to each of the UEs 130. In addition or alternatively, MME 150 may store in subscriber location memory 160 information identifying geographic locations of the UE 130. For example, eNBs 130 may 140 may determine the geographic locations of the UE 130 based on signals received from the UEs and may forward the geographic locations to the MME 150.

Continuing with environment 100 in FIG. 1, SGW/PGW 170 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers network data. SGW/PGW 170 may, for example, aggregate traffic received from one or more eNBs 140 and may send the aggregated traffic to IMS core 110. SGW/PGW 170 may also perform operations associated with handing off UE 130 from one eNB 140 to another eNB 14. SGW/PGW 170 may also, or alternatively, receive, from SCBF 120, instructions to suspend a VoLTE call. SGW/PGW 170 may, in response to the instructions, continue to perform signaling and/or maintain protocols (e.g., tunneling protocols, etc.), associated with the call and to switch the call to 1× system 102, which may minimize terminating the call. SGW/PGW 170 may further function to provide connectivity of UE 130 to 1× system 102.

The quantity of devices and/or networks, illustrated in FIG. 1, is provided for explanatory purposes only. In practice, there may be additional devices and/or networks, fewer devices and/or networks, different devices and/or networks, or differently arranged devices and/or networks than those illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Figure 2:
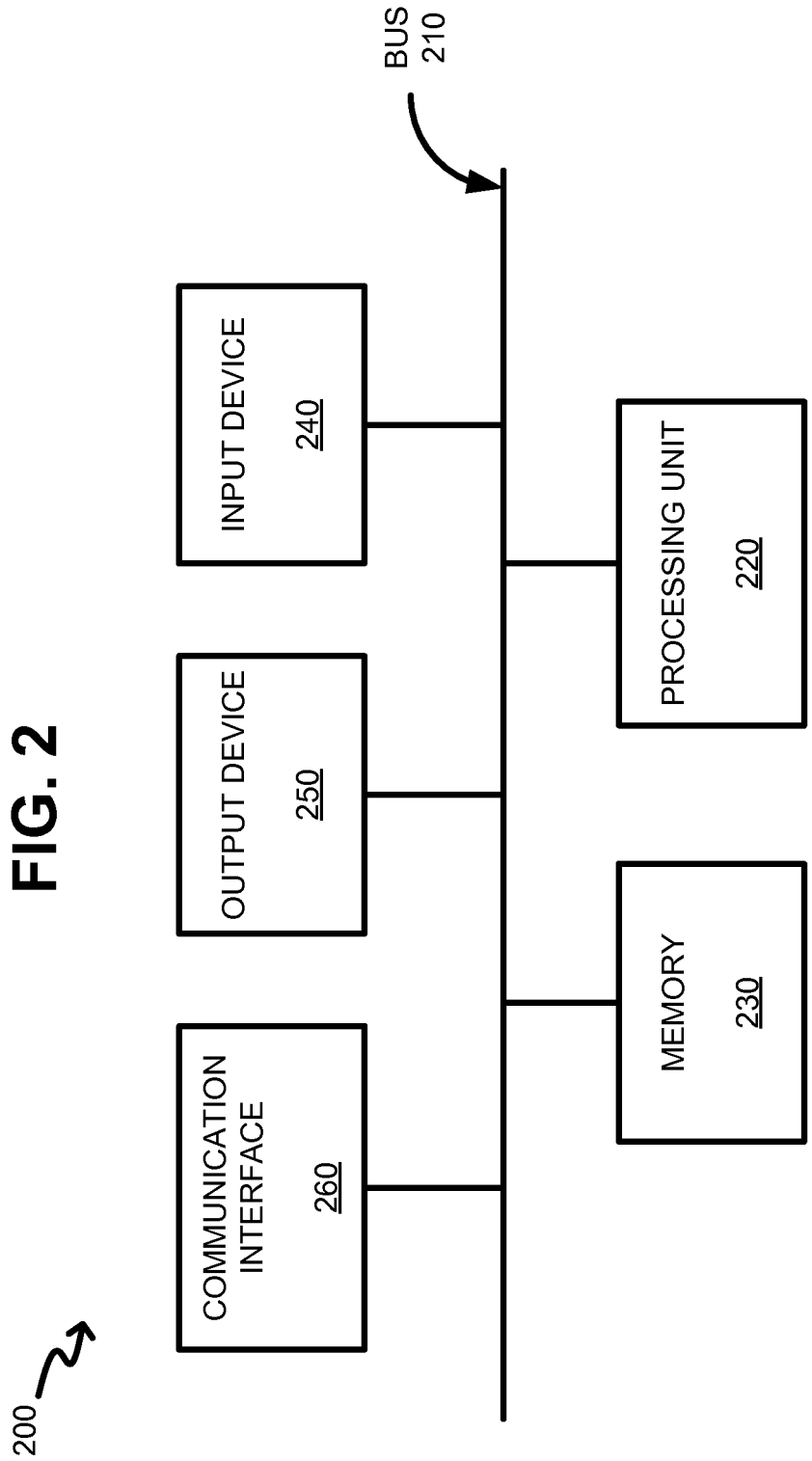
FIG. 2 shows a diagram of exemplary components that may be included in a computing device included in the environment shown in FIG. 1.

FIG. 2 is a diagram illustrating exemplary components of a computing device 200. Computing device 200 may correspond, for example, to SCBF 120, MME 150, or SGW/PGW 170. Alternatively or additionally, SCBF 120, MME 150, or SGW/PGW 170 may include one or more devices 200 and/or one or more components of computing device 200.

Computing device 200 may include a bus 210, a processor 220, a memory 230, an input component 240, an output component 250, and a communication interface 260. Although FIG. 2 shows exemplary components of computing device 200, in other implementations, computing device 200 may contain fewer components, additional components, different components, or differently arranged components than those depicted in FIG. 2. For example, computing device 200 may include one or more switch fabrics instead of, or in addition to, bus 210. Additionally, or alternatively, one or more components of computing device 200 may perform one or more tasks described as being performed by one or more other components of computing device 200.

Bus 210 may include a path that permits communication among the components of computing device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to computing device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables computing device 200 to communicate with other devices and/or systems via wireless communications, wired communications, or a combination of wireless and wired communications. For example, communication interface 260 may include mechanisms for communicating with another device or system via a network, such as IMS 110. Alternatively or additionally, communication interface 260 may be a logical component that includes input and output ports, input and output systems, and/or other input and output components that facilitate the transmission of data to other devices.

Computing device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Computing device 200 may include fewer components, additional components, different components, and/or differently arranged components than those illustrated in FIG. 2. As an example, in some implementations, a display may not be included in computing device 200. In these situations, computing device 200 may be a "headless" device that does not include input component 240. Additionally, or alternatively, one or more operations described as being performed by a particular component of computing device 200 may be performed by one or more other components, in addition to or instead of the particular component of computing device 200.

Figure 3:
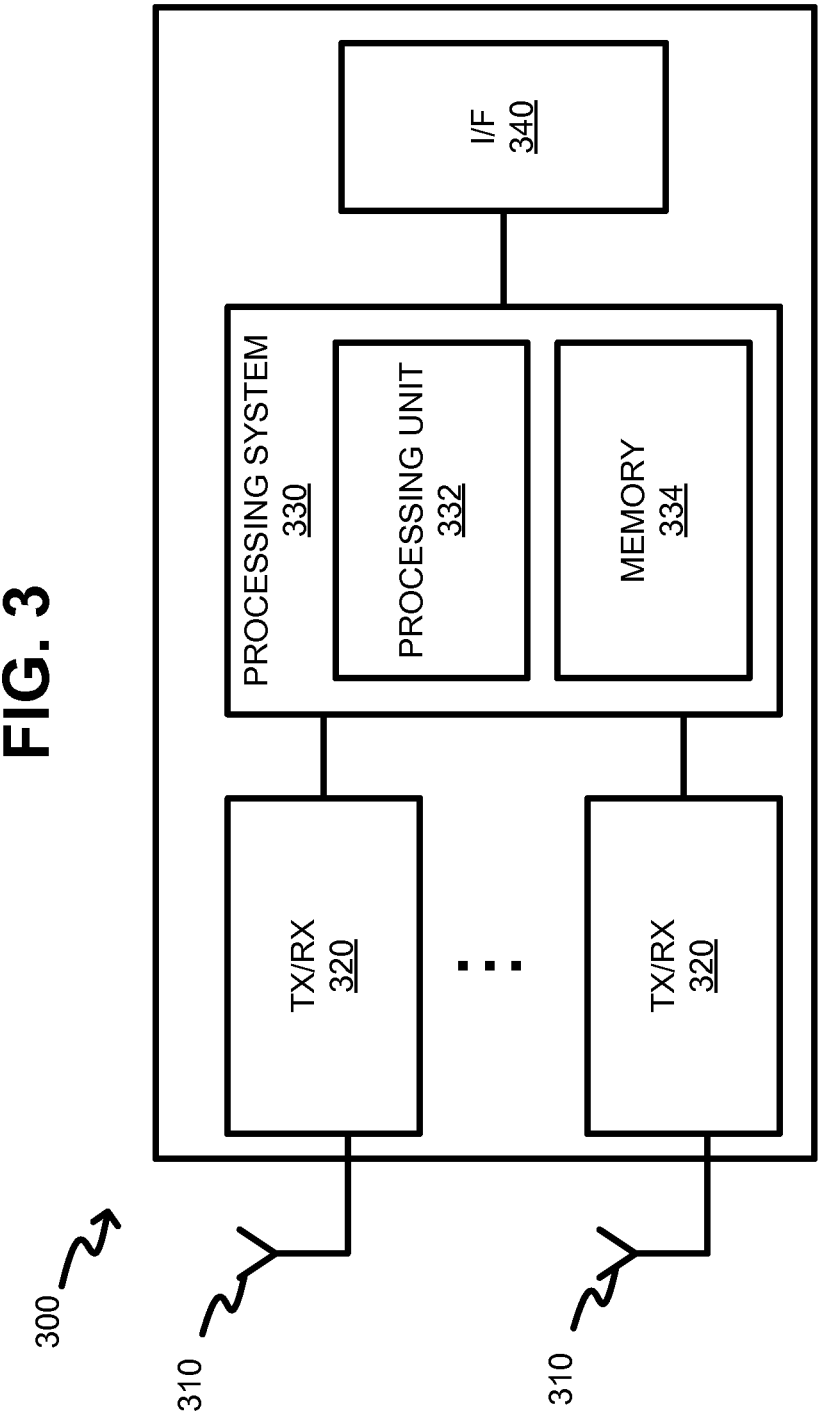
FIG. 3 shows a diagram of exemplary components that may be included in a base station device included in the environment shown in FIG. 1.

FIG. 3 is a diagram of exemplary components of a base station device 300 that may correspond to eNB 140 according to an implementation described herein. As shown in FIG. 3, base station device 300 may include antennas 310, transceivers (TX/RX) 320, a processing system 330, and an interface (IF) 340.

Antennas 310 may include one or more directional and/or omnidirectional antennas. Transceivers 320 may be associated with antennas 310 and may include transceiver circuitry for transmitting and/or receiving traffic within a network, such as a wireless network, via antennas 310.

Processing system 330 may control the operation of base station device 300. Processing system 330 may also process information received via transceivers 320 and interface 340. Processing system 330 may further measure quality and strength of a connection and determine a frame error rate (FER), and transmit this information to MME 150 and/or some other device. As illustrated, processing system 330 may include a processing unit 332 and a memory block 334. Alternatively, or additionally, processing system 330 may include fewer components, additional components, different components, and/or differently arranged components than those illustrated in FIG. 3.

Processing unit 332 may include one or more processors, microprocessors, etc, and may process information received via transceivers 320 and interface 340. The processing may include, for example, data conversion, forward error correction (FEC), rate adaptation, Wideband Code Division Multiple Access (WCDMA) spreading/despreading, and quadrature phase shift keying (QPSK) modulation, etc. In addition, processing unit 332 may generate control messages and/or data messages (e.g., within high speed-downlink shared channel (HS-DSCH) data frames) and cause those control messages and/or data messages to be transmitted via transceivers 320 and/or interface 340. Processing unit 332 may also process control messages and/or data messages received from transceivers 320 and/or interface 340.

Memory block 334 may include any type of dynamic storage device that may store information and instructions, for execution by processing unit 332, and/or any type of non-volatile storage device that may store information for use by processing unit 332. Interface (IF) 340 may include one or more input/output components that allow base station device 300 to transmit data to and receive data from MME 150, SGW/PGW 170, etc.

Base station device 300 may include fewer components, additional components, different components, and/or differently arranged components than those illustrated in FIG. 3. Additionally, or alternatively, one or more operations described as being performed by a particular component of base station device 300 may be performed by one or more other components, in addition to or instead of the particular component of base station device 300.

Figure 4:
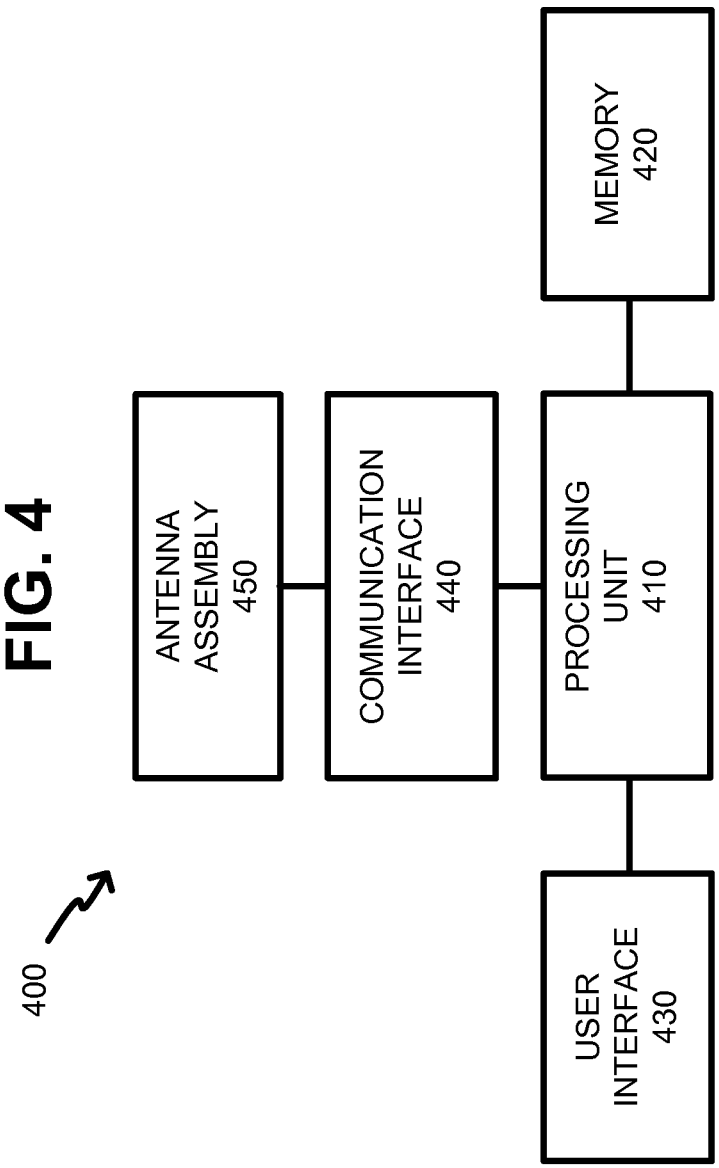
FIG. 4 shows a diagram of exemplary components that may be included in a user device) included in the environment shown in FIG. 1.

FIG. 4 is a schematic diagram that shows exemplary components of a communications device 400 that may correspond to UE 130. As shown in FIG. 4, communications device 400 may include a processing unit 410, a memory 420, a user interface 430, a communication interface 440, and/or an antenna assembly 450. Although FIG. 4 shows exemplary components of communications device 400, in other implementations, communications device 400 may include fewer components, additional components, different components, or differently arranged components than those depicted in FIG. 4. In still other implementations, one or more components of communications device 400 may perform one or more tasks described as being performed by one or more other components of communications device 400.

A processing unit 410 may include a processor, a microprocessor, an ASIC, a FPGA, or the like. A processing unit 410 may control operation of communications device 400 and its components. In one implementation, a processing unit 410 may control operation of components of communications device 400 in a manner similar to that described herein. Memory 420 may include a RAM, a ROM, and/or another type of memory to store data and/or instructions that may be used by a processing unit 410. In one implementation, memory 420 may include a queue to store data associated with estimated events.

User interface 430 may include mechanisms for inputting information to communications device 400 and/or for outputting information from communications device 400. Examples of input and output mechanisms might include buttons; a touch screen interface to permit data and control commands to be input into communications device 400 via a touch screen; a biometric device to receive fingerprint scans, retinal scans, facial signatures, etc.; a speaker to receive electrical signals and output audio signals; a microphone to receive audio signals and output electrical signals; a display (e.g., a touch screen) to output visual information (e.g., user interfaces, web pages, etc.); a vibrator to cause communications device 400 to vibrate; and/or a camera to receive video and/or images.

Communication interface 440 may include, for example, a transmitter that may convert baseband signals from a processing unit 410 to RF signals and/or a receiver that may convert RF signals to baseband signals. Alternatively, communication interface 440 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 440 may connect to antenna assembly 450 for transmission and/or reception of the RF signals.

Antenna assembly 450 may include one or more antennas to transmit and/or receive RF signals over the air. Antenna assembly 450 may, for example, receive RF signals from communication interface 440 and transmit them over the air, and receive RF signals over the air and provide them to communication interface 440. In one implementation, for example, communication interface 440 may communicate with a network and/or devices connected to a network.

As described in detail below, communications device 400 may perform certain operations described herein in response to a processing unit 410 executing software instructions of an application contained in a computer-readable medium, such as memory 420. The software instructions may be read into memory 420 from another computer-readable medium or from another device via communication interface 440. The software instructions contained in memory 420 may cause a processing unit 410 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 depicts exemplary components of communications device 400, in other implementations, user communications device 400 may include fewer components, additional components, different components, or differently arranged components than those illustrated in FIG. 4. Furthermore, one or more components of communications device 400 may perform one or more tasks described as being performed by one or more other components of communications device 400.

Figure 5:
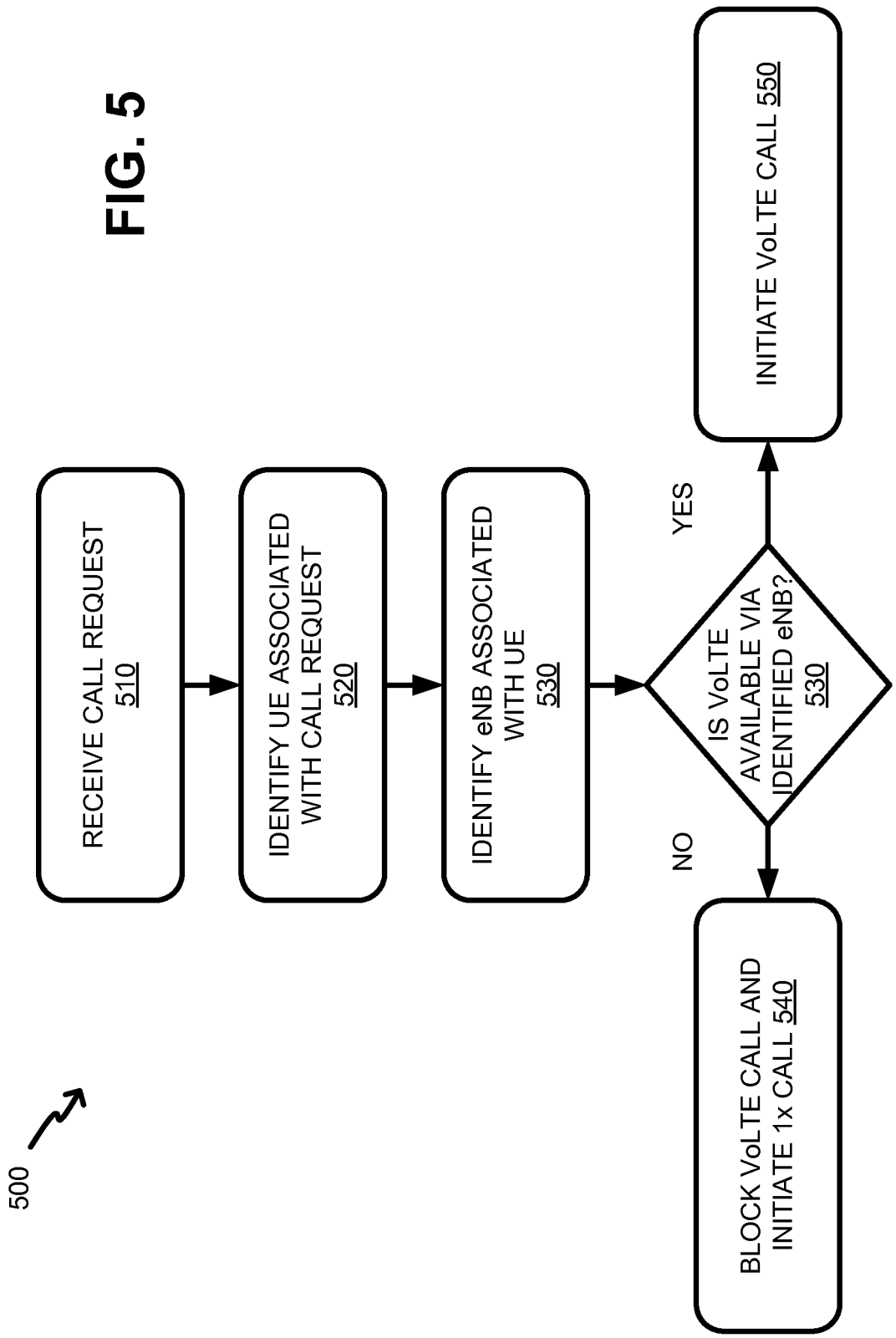
FIGS. 5 and 6 show flow diagrams of an exemplary process for an IP multimedia subsystem (IMS)-based method of selective call blocking based on user's location and call re-direction over a different (i.e., non-IMS) network in the environment shown in FIG. 1.

FIG. 5 is a flow diagram illustrating an exemplary process 500 for selective VoLTE call blocking and call re-direction. In one implementation, process 500 may be performed by SCBF 120 in communications with MME 150 and/or subscriber location memory 160. In other implementations, process 500 may be performed by one or more other devices of environment 100, such as SGW/PGW 170.

As shown in FIG. 5, process 500 may include receiving a VoLTE call request (block 510). For example, SCBF 120 may receive a call request (e.g., a VoLTE call setup message) from UE 130 for VoLTE communications with calling device 101 via IMS core 110. SCBF 120 may receive the call request from MME 150 and/or SGW/PGW 170. Alternatively, SCBF may receive a call request from calling device 101 for VoLTE communications with UE 130 via IMS core 110.

Continuing with process 500 in FIG. 5, SCBF 120 may identify a particular UE 130 associated with the call request (block 520). For example, SCBF 120 may parse the call request to locate an MDN, an IMSI, or other information identifying the particular UE 130. In another example, SCBF 120 may identify the particular UE 130 based on information received from MME 150 and/or SGW/PGW 170. For example, MME 150 and/or SGW/PGW 170 may update a subscriber profile associated with the particular UE 130 to reflect the call request, and SCBF 120 may determine the particular UE 130 associated with the updated subscriber profile.

Continuing with FIG. 5, process 500 may include SCBF 120 identifying a particular eNB 140 associated with the particular UE 130 (block 530). For example, SCBF 120 may identify a SGW/PGW 170 forwarding the call request and may identify the particular eNB 140 associated with the SGW/PGW 170.

Figure 6:
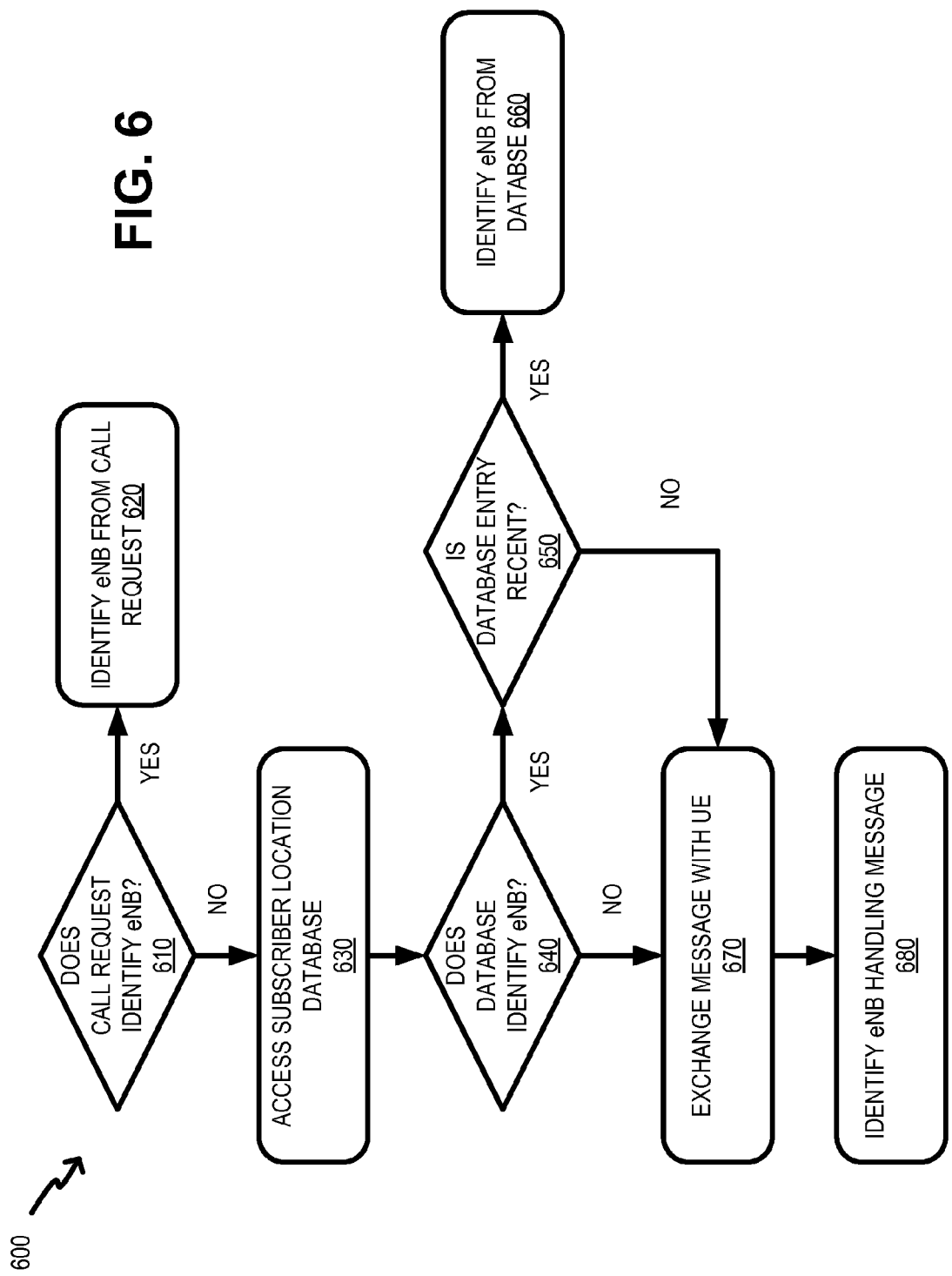

FIG. 6 is a flow diagram illustrating an exemplary process 600 for identifying the eNB 150 associated with the particular UE 150 in process block 530. In one implementation, process 600 may be performed by SCBF 120. In other implementations, process 600 may be performed by one or more other devices of environment 100, such as SGW/PGW 170.

As shown in FIG. 6, process 600 may include determining whether the call request identifies the eNB 140 associated with the particular UE 130 (block 610), and if the call request identifies the eNB 140 (block 610—"YES"), SCBF 120 may determine the eNB 140 from the call request (block 620). For example, SCBF 120 may parse the call request to extract information, such as an eNB identifier, specifying the eNB 140.

If the call request does not identify an eNB 140 (block 610—"NO"), SCBF 120 may access subscriber location memory 160 (block 630) to determine whether subscriber location memory 160 identifies the eNB 140 associated with the UE 130 (block 640). As previously described with respect to FIG. 1, subscriber location memory 160 may store subscriber profiles associated with UE 130 and the subscriber profiles may be updated to identify eNB 140 associated with the UE 130. For example, MME 150 may update subscriber location memory 160 to identify the eNB 140 receiving connection requests or other messages from UE 130. MME 150 may also update subscriber location memory 160 based on receiving a message from another eNB 140 indicating the UE 130 is be handed over to the eNB 140.

If an entry for UE 130 in subscriber location memory 160 identifies the eNB 140 (block 640—"YES"), SCBF 120 may determine whether the memory entry is recent (block 650). For example, SCBF 120 may determine whether the memory entry has been updated during a threshold time period. If the entry is recent (block 650—"YES"), SCBF 120 may determine the eNB 140 from the subscriber location memory (block 660).

Otherwise, if either the subscriber location memory 160 does not identify the eNB 140 (block 640—"NO") or if the entry is not recent (block 650—"NO"), SCBF 120 or another component of environment 100 may exchange a message, such as forwarding a status message to UE 130 (block 670) and identifying the eNB 140 handling the message to the UE 130 (block 680).

Returning back to FIG. 5, process 500 may include SCBF 120 determining whether the particular eNB 140 supports VoLTE communications (block 540). For example, SCBF 120 may access eNB configuration memory 122 that stores a list of eNBs that supports VoLTE communications. In another example, SCBF 120 may dynamically evaluate the particular eNB 140. For example, SCBF 120 may forward an LTE-based message to the particular eNB 140 and evaluate how the particular eNB 140 handles the LTE-based message. For example, SCBF 120 may determine, based on the sending the LTE message, whether the particular eNB 140 provides sufficient bandwidth to the UE 130, during call setup, to support the VoLTE call. If SCBF 120 determines that the particular eNB 140 supports the VoLTE call, SCBF 120 may update the eNB configuration memory 122.

If VoLTE communications are unavailable via the particular eNB 140 (block 540—"No"), SCBF 120 may take actions to block the VoLTE call and initiate a corresponding non-IP call (e.g., via 1× system 102) (block 550). For example, SCBF 120 may forward instructions to UE 130 to communicate via 1× system 102. Additionally or alternatively, SCBF 120 may forward instructions to SGW/PGW 170 to transfer data associated with the VoLTE communication to 1× system 102. If VoLTE communications are available via the particular eNB 140 (block 540—"YES"), SCBF 120 may take no action to block the VoLTE communications (block 560).

While a series of blocks has been described with respect to FIGS. 5 and 6, the order of the blocks in processes 500 and 600 may be modified in other implementations. Furthermore, non-dependent blocks may be performed in parallel. Furthermore, processes 500 and 600 may include additional and/or fewer blocks than shown in FIGS. 5 and 6. For example, SCBF 120 may further determine whether UE 130 supports VoLTE communications, and may block the VoLTE call and initiate a corresponding 1× call in process block 550 when the UE 130 does not support VoLTE communications.

In another implementation (not shown in FIG. 5), SCBF 120, based on determining that a VoLTE communications is not optimized through the eNB 140 (block 540—"NO"), may first attempt to cause the UE 130 to be handed to another eNB 140 that supports VoLTE. SCBF 120 may identify other eNBs 140 within range (e.g., within a threshold distance) of the UE 130. For example, SCBF 120 may access subscriber location memory 160 to determine a location of the UE 130 and use this location to identify the other eNBs 140. SCBF 120 may then initiate a handover of the UE 130 to one of the other eNBs 140 that supports VoLTE. In this example, SCBF 120 may block the VoLTE call and initiate the 1× communications in process block 550 if no other eNBs 140 are not in communications range of the UE 130, or if none of the other eNBs 140 support the VoLTE call.

Figure 7:
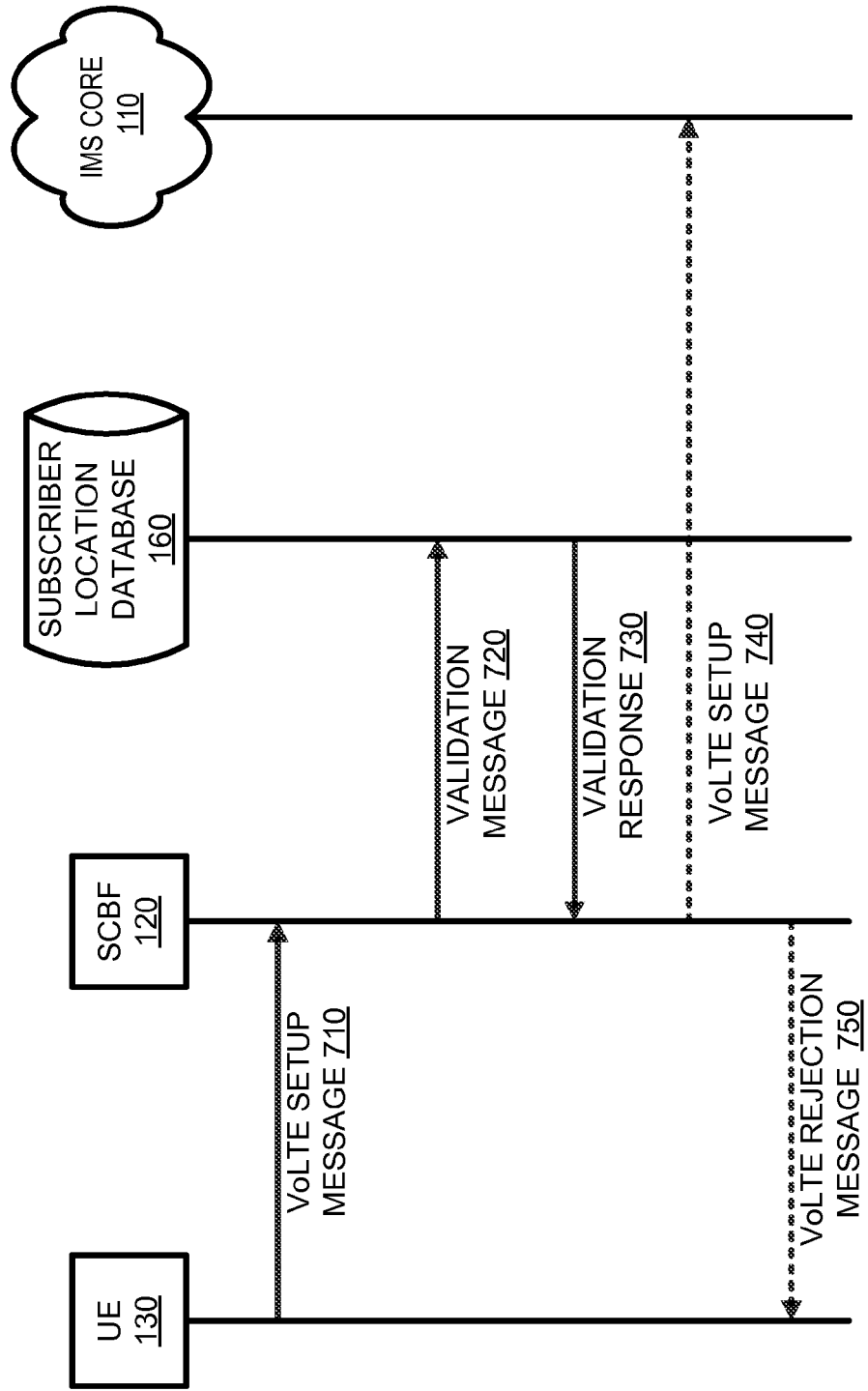

FIG. 7 shows exemplary communications 700 related to an outgoing VoLTE call request from a UE 130. SCBF 120 may receive a VoLTE setup message 710 sent by the UE 130 to IMS core 110 to initiate a call to calling device 101. VoLTE setup message 710 may include, for example, data identifying UE 130, eNB 140, calling device 101, etc. SCBF 120 may identify UE 130 (e.g., based on the contents of VoLTE setup message 710) and forward a validation message 720 to subscriber location memory 160 requesting an identity of an eNB 140 coupled to the UE 130. Subscriber location memory 160 may return, to SCBF 120, a validation response 730 that includes information identifying the eNB 140 and/or information that SCBF 120 can use to identify the eNB 140 (e.g., the location of the UE 130). SCBF 120 may further determine whether a VoLTE call is allowed via the particular eNB 140. For example, validation response 730 may indicate whether the eNB 140 is optimized for VoLTE communications.

If the VoLTE call is allowed via the particular eNB 140, regular IMS signaling may continue with respect to establishing the VoLTE call. For example, SCBF 120 may forward VoLTE setup message 740 to a component of IMS core 110 (e.g., a CSCF device not shown in FIG. 7) to establish the VoLTE communications between UE 130 and calling device 101. Conversely, if the VoLTE call is not supported by the particular eNB 140, SCBF 120 may send a VoLTE rejection message 750 to the particular UE 130 (or another component of environment 100) that causes a call to be initiated on a non-IP system, such as 1× system 102. For example, VoLTE rejection message 750 may include information identifying calling device 101 and UE 130 and instructions to establish the 1× call.

FIG. 8 shows exemplary communications 800 related to an incoming VoLTE call request 810 from a calling device 101. SCBF 120 may evaluate the incoming call request 810 from calling device 101 to identify an associated UE 130. For example, SCBF 120 may parse the contents of the VoLTE call request 810 to identify the UE 130. SCBF 120 may forward a validation message 820 to subscriber location data 160 to perform a look up of the UE 130. For example, validation message 820 may identify the UE 130 and request information identifying an associated eNB 140 and/or a geographic location of the UE 130.

Subscriber location memory 160 may forward a validation response 830 that identifies the eNB 140 and/or the geographic location of the UE 130. SCBF 120 may then identify a particular eNB 140 associated with the geographic location and determine whether the particular eNB 140 is optimized for VoLTE communications (e.g., determine whether an LTE data connection can be established to the associated UE 130 via the particular eNB 140 and IMS core 110). For example, the validation response 830 may include an indication of whether the particular eNB 140 supports VoLTE communications. In another example, SCBF 120 may store (e.g., in eNB configuration memory), information identifying eNBs 140 that are optimized for VoLTE communications, and SCBF 120 may determine whether the particular eNB 140 is included in the identified eNBs 140 that are optimized for VoLTE communications.

If the VoLTE call is allowed via the particular eNB 140, regular IMS signaling may continue with respect to establishing the VoLTE call between calling device 101 and the associated UE 130. For example, SCBF 120 may forward VoLTE set up communications 840 to UE 130 and/or another component of environment 100 (e.g., SGW/PGW 170) to establish the VoLTE call with calling device 101. Conversely, if the VoLTE call is not allowed by the particular eNB 140, SCBF 120 may set up 1× communications 850 to UE 130 and/or another component of environment 100 (e.g., SGW/PGW 170) to redirect the call to 1× system 102 (without establishing the VoLTE communications).

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a processor included in a selective call blocking function (SCBF) device, a request to establish an internet protocol (IP) call through an IP multimedia subsystem (IMS);
identifying, by the processor and based on the request, a user equipment (UE) associated with the IP call, wherein identifying the UE associated with the IP call includes:
parsing the request; and
identifying the UE based on the parsed request;
identifying, by the processor, an eNode B (eNB) exchanging data with the UE, wherein identifying the eNB includes:
determining whether a subscriber location memory associated with the IMS stores an entry for the UE, wherein the entry includes a geographic location associated with the UE,
when no subscriber location memory is associated with the UE or when the entry for the UE is not updated during a threshold time period, forwarding a message to the UE, and
when the message is forwarded to the UE, identifying, as the eNB, a base station handling the message;
determining, by the processor, whether the eNB supports the IP call, wherein the IP call is established via the IMS when the eNB supports the IP call, and wherein determining whether the eNB supports the IP call includes:
identifying a group of eNBs that support IP calls; and
determining that the eNB supports the IP call when the eNB is included in the group of eNBs; and
initiating, by the processor, a non-IP call associated with the UE when the eNB does not support the IP call.

2. The method of claim 1, wherein the IP call is a voice over long term evolution (LTE) call.

3. The method of claim 1, wherein the non-IP call is a code division multiple access (CDMA) 2000 one times (1×) call.

4. A device comprising:
a memory configured to store:
one or more instructions, and
information identifying a group of eNBs that support IP calls; and
a processor included in a selective call blocking function (SCBF) device associated with an internet protocol (IP) multimedia subsystem (IMS), wherein the processor is configured to execute the one or more instructions to:
receive a request to establish an IP call through the IMS,
identify, based on the request, a user equipment (UE) associated with the IP call, wherein the processor, when identifying the UE associated with the IP call, is further configured to:
parse the request, and
identify the UE based on the parsed request,
identify an eNode B (eNB) exchanging data with the UE, wherein the processor, when identifying the eNB, is further configured to:
determine whether a subscriber location memory associated with the IMS stores an entry for the UE and a geographic location associated with the UE,
when no entry stored by the subscriber location memory is associated with the UE or when the entry for the UE is not updated during a threshold time period, forward a message to the UE, wherein the forwarded message identifies, as the eNB, a base station handling the message, determine whether the eNB supports the IP call, wherein the IP call is established via the IMS when the eNB supports the IP call, and wherein the processor, when determining whether the eNB supports the IP call, is further configured to determine that the eNB supports the IP call when the eNB is included in the group of eNBs that support IP calls, block the IP call when the eNB does not support the IP call, and initiate a non-IP call.

5. The device of claim 4, wherein the processor, when blocking the IP call, is further configured to forward a message to one or more of a servicing gateway (SGW) or a packet data network gateway (PGW) associated with the IMS.

6. The device of claim 5, wherein the message further causes the one or more of the SGW or the PGW to establish the non-IP call to the UE.

7. A non-transitory computer-readable medium to store one or more instructions that when executed by a processor in a selective call blocking function (SCBF) device associated with an internet protocol (IP) multimedia subsystem (IMS), cause the processor to:

receive a request to establish an IP call through the IMS, identify, based on the request, a user equipment (UE) associated with the IP call, wherein the one or more instructions, when identifying the UE associated with the IP call, further cause the processor to:
parse the request, and
identify the UE based on the parsed request, identify an eNode B (eNB) exchanging data with the UE, wherein the one or more instructions further cause the processor, when identifying the eNB, to further:
determine whether a subscriber location memory associated with the IMS stores an entry for the UE, wherein the subscriber location memory stores entries identifying geographic locations associated with a plurality of UEs serviced by the IMS,
when none of the entries stored by the subscriber location memory is associated with the UE or when the entry for the UE is not updated during a threshold time period, forward a message to the UE, and
when the message is forwarded to the UE, identify, as the eNB, a base station handling the message, determine whether the eNB supports the IP call, wherein the IP call is established via the IMS when the eNB supports the IP call, and wherein the one or more instructions, when causing the processor to determine whether the eNB supports the IP call, further cause the processor to:
identify a group of eNBs that support IP calls, and
determine that the eNB supports the IP call when the eNB is included in the group of eNBs, and block the IP call when the eNB does not support the IP call.

8. The non-transitory computer-readable medium of claim 7, wherein the one or more instructions, when causing the processor to block the IP call, further cause the processor to forward a message to one or more of a servicing gateway (SGW) or a packet data network gateway (PGW) associated with the IMS.

9. The non-transitory computer-readable medium of claim 7, wherein the one or more instructions, when causing the processor to determine whether the eNB supports the IP call, further cause the processor to:
forward an IP message toward the UE, and
determine that the eNB supports the IP call when the eNB delivers the IP message to the UE.

10. The method of claim 1, wherein determining whether the eNB supports the IP call further includes:
forwarding an IP message toward the UE, and
determining that the eNB supports the IP call when the eNB delivers the IP message to the UE.

11. The method of claim 1, further comprising:
forwarding, to a call session control function (CSCF) device, an IP call setup message based on determining that the eNB supports the IP call, wherein the CSCF device establishes the IP call to the UE based on receiving the IP call setup message.

12. The device of claim 4, wherein the processor, when determining whether the eNB supports the IP call, is further configured to:
forward an IP message toward the UE, and
determine that the eNB supports the IP call when the eNB delivers the IP message to the UE.

13. The device of claim 4, wherein the processor is further configured to:
forward, to a call session control function (CSCF) device, an IP call setup message when the eNB supports the IP call, wherein the CSCF device establishes the IP call between the UE and another device based on receiving the IP call setup message.

14. The non-transitory computer-readable medium of claim 7, wherein the one or more instructions further cause the processor to:
forward, to a call session control function (CSCF) device, an IP call setup message when the eNB supports the IP call, wherein the CSCF device establishes the IP call between the UE and another device based on receiving the IP call setup message.

15. The non-transitory computer-readable medium of claim 7, wherein the one or more instructions that cause the processor to block the IP call further cause the processor to:
determine a location associated with the UE,
identify another eNB at the location associated with the UE, wherein the other eNB supports the IP call, and
initiate a handover of the UE to the other eNB.

* * * * *